(12) United States Patent
Chan

(10) Patent No.: US 8,496,345 B2
(45) Date of Patent: Jul. 30, 2013

(54) SOUND CONTROL CANDLE LIGHT

(75) Inventor: Fu Hsing Chan, Taipei (TW)

(73) Assignee: J.C. Homan Corp., Taipei (TW)

( * ) Notice: Subject to any disclaimer, the term of this patent is extended or adjusted under 35 U.S.C. 154(b) by 448 days.

(21) Appl. No.: 12/952,632

(22) Filed: Nov. 23, 2010

(65) Prior Publication Data
US 2012/0126724 A1 May 24, 2012

(51) Int. Cl.
*F21L 19/00* (2006.01)

(52) U.S. Cl.
USPC ............ 362/161; 362/186; 362/383; 362/375

(58) Field of Classification Search
USPC .................... 362/86, 161, 186, 383, 375, 565
See application file for complete search history.

(56) References Cited

U.S. PATENT DOCUMENTS 7,506,989 B2 * 3/2009 Tomassetti et al. ............. 362/86
2004/0160764 A1 * 8/2004 Lee ............................... 362/161

* cited by examiner

*Primary Examiner* — Vip Patel
(74) *Attorney, Agent, or Firm* — Rosenberg, Klein & Lee

(57) ABSTRACT

A sound control candle light includes a candle light having a lampshade shaped like the flame of a candle and a light-emitting device surrounded by the lampshade, a sound generator having an enclosed sound pipe with a mouthpiece and a reed mounted inside the enclosed sound pipe adjacent to the mouthpiece and vibratable to produce a sound at a predetermined frequency when a person blows in the mouthpiece, a sound sensor mounted inside the enclosed sound pipe for sensing the sound produced by the reed and providing a corresponding sensing signal, and a control circuit adapted for receiving the sensing signal provided by the sound sensor to drive on/off the light-emitting device. Thus, a specific sound frequency different from surrounding noises can be produced, enabling the sound control candle light to be alternatively turned on and off when it is blown by the user, assuring high control reliability.

10 Claims, 3 Drawing Sheets

SOUND CONTROL CANDLE LIGHT

BACKGROUND OF THE INVENTION

1. Field of the Invention

The present invention relates to sound control technology and more particularly, to a sound control candle light, which causes vibration of a reed to produce a sound at a specific frequency for controlling on/off of the light when the user blows in an enclosed sound pipe.

2. Description of the Related Art

Taiwan Utility Model No. M328897 discloses a toy entitled "Sound control toy cake", which comprises a lamp holder shaped like a cake carrying a candle, and a lamp and sound sensor mounted inside the lamp holder. When the lamp is turned on, it provides an effect like the burning of a candle. When the user blows air toward the lamp, the lamp will be turned off, simulating the flame extinguishing action of a candle without causing any risk.

According to the aforesaid sound control toy cake, the user can blow air into the pipe on the lamp holder, enabling the sound sensor to sense the sound produced subject to friction between the blowing air and the through holes of the pipe and to further drive a circuit device to turn off the lamp, simulating the action of extinguishing the flame of a candle by blowing in it. However, because the sound frequency produced subject to this principle exists in the surroundings, the sound control toy cake tends to be triggered by surrounding noises to turn off the lamp erroneously.

SUMMARY OF THE INVENTION

It is one object of the present invention to provide a sound control candle light, which can generate a specific sound frequency for easy discrimination from surrounding noises so that the candle light will be accurately turned on when the user blows in it at a first time, and then accurately turned off when the user blows in it at a second time, assuring high reliability.

To achieve this and other objects of the present invention, a sound control candle light comprises a candle light having a lampshade shaped like the flame of a candle and a light-emitting device mounted inside the lampshade, a sound generator having an enclosed sound pipe with a mouthpiece and a reed mounted inside the enclosed sound pipe adjacent to the mouthpiece and vibratable to produce a sound at a predetermined frequency when a person blows in the mouthpiece, a sound sensor mounted inside the enclosed sound pipe and adapted for sensing the sound produced by the reed and providing a corresponding sensing signal, and a control circuit adapted for receiving the sensing signal provided by the sound sensor to drive on/off the light-emitting device.

Further, the candle light can be mounted on a toy birthday cake or a candleholder.

Further, the light-emitting device can be a light-emitting diode.

Further, the enclosed sound pipe can be shaped like a horn.

In another embodiment of the present invention, the sound control candle light further comprises a base member supporting the toy birthday cake and a music box mounted inside the base member and adapted for playing a happy birthday sound.

In still another embodiment of the present invention, the sound control candle light further comprises a glass spherical shell mounted on the base member around the toy birthday cake in a watertight manner, a fluid filled in the glass spherical shell, and ornamental items placed in the fluid inside the glass spherical shell.

In still another embodiment of the present invention, the sound control candle light further comprises a power supply device electrically connected with the light-emitting device, the sound sensor and the control circuit to provide the light-emitting device, the sound sensor and the control circuit with the necessary working DC power, and a power switch switchable to turn on/off the power supply device.

Further, the power supply device can be a battery. Alternatively, the power supply device can be an AC-DC power adapter adapted for converting city AC power to DC power.

Subject to the installation of the reed in the enclosed sound pipe, the reed will be vibrated to produce a sound at a specific sound frequency different from surrounding noises when the user blows the mouthpiece of the enclosed sound pipe with the mouth. At this time, the sound sensor will sense the sound frequency and provides a corresponding sensing signal to the control circuit, causing the control circuit to turn on/off the light-emitting device positively without error. Thus, the candle light can be turned on/off, simulating a real candle.

Other advantages and features of the present invention will be fully understood by reference to the following specification in conjunction with the accompanying drawings, in which like reference signs denote like elements of structure.

DETAILED DESCRIPTION OF THE PREFERRED EMBODIMENT

Figure 1:
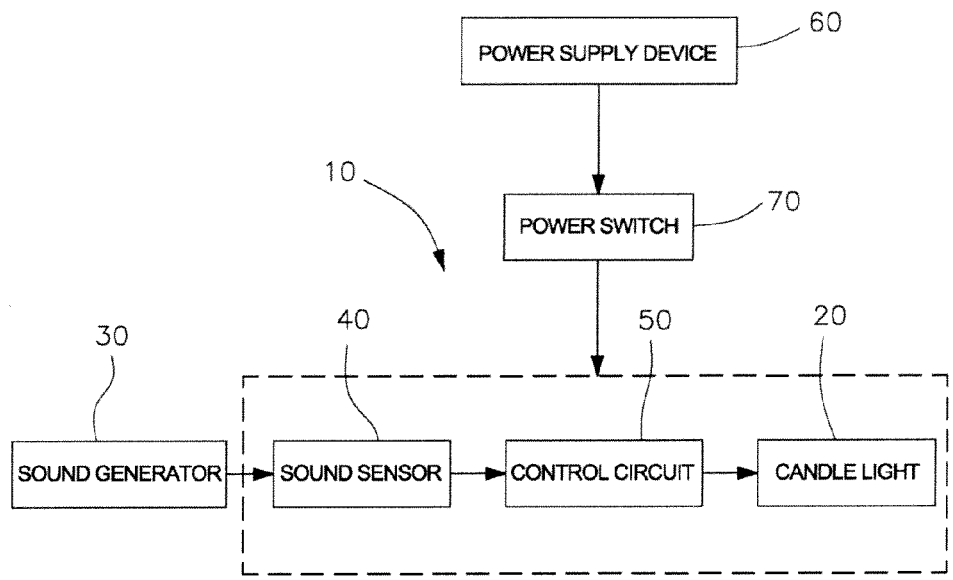
FIG. 1 is a circuit block diagram of a sound control candle light in accordance with the present invention.
Figure 2:
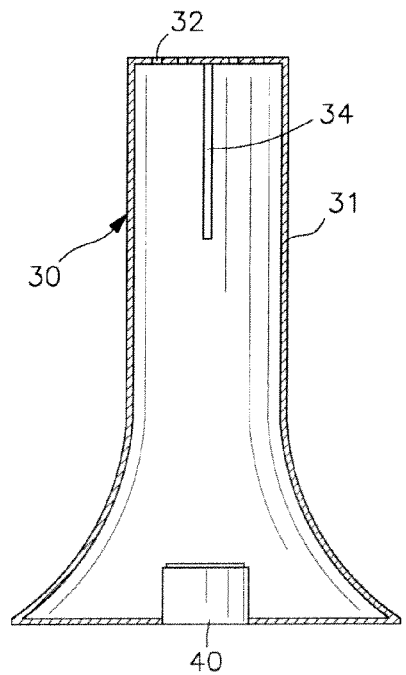
FIG. 2 is a sectional view of the sound generator of the sound control candle light in accordance with the present invention.
Figure 3:
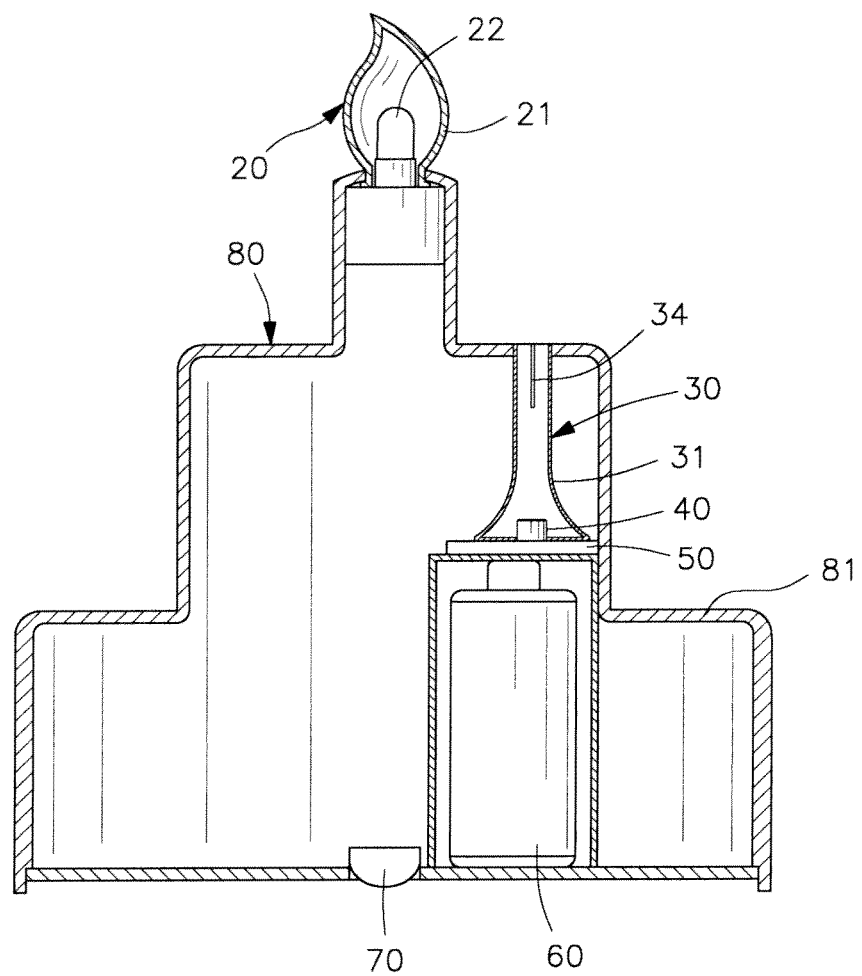
FIG. 3 is a sectional applied view of the present invention, illustrating the sound control candle light used in a birthday cake.

FIG. 1 is a circuit block diagram of a sound control candle light 10 in accordance with the present invention. FIG. 2 is a sectional view of the sound generator 30 of the sound control candle light 10 in accordance with the present invention. FIG. 3 is a sectional view illustrating a toy birthday cake 80 embodying the present invention. The sound control candle light 10 comprises a candle light 20, a sound generator 30, a sound sensor 40 and a control circuit 50.

The candle light 20 comprises a lampshade 21 shaped like the flame of a real candle, and a light-emitting device 22 surrounded by the lampshade 21. The light-emitting device 22 is preferably a light-emitting diode (LED) for the advantages of safety, low power consumption and long lifespan. When the light-emitting device 22 is emitting light through the lampshade 21, a lighting effect simulating the flame of a real candle is produced. Thus, the user needs no to worry about the problem of flame extinguishing or fire accident.

The sound generator 30 comprises a horn-like sound pipe 31 that has two opposite ends. One end of the horn-like sound pipe 31 is a mouthpiece 32. The other end of the horn-like sound pipe 31 is closed. Thus, the horn-like sound pipe 31 is approximately enclosed to isolate the surrounding sound. The sound generator 30 further comprises a reed 34 mounted inside the horn-like sound pipe 31 adjacent to the mouthpiece 32. Thus, when the user blows the mouthpiece with the mouth, the reed 34 will be vibrated to produce a specific sound frequency.

The sound sensor 40 is mounted inside the horn-like sound pipe 31 below the reed 34, and adapted for sensing the specific sound frequency produced upon vibration of the reed 34 and generating a sensing signal.

The control circuit 50 is adapted for receiving the signal produced by the sound sensor 40 and amplifying the voltage or power subject to the requirement of the load, and then driving the light-emitting device 22 to turn on/off the light. As the control circuit 50 is of the known art and not within the scope of the spirit of the invention, no further detailed description in this regard is necessary.

Further, a power supply device 60 provides the sound control candle light 10 with the necessary working DC power. The power supply device 60 is electrically connected to the loop of the candle light 20, the sound sensor 40 and the control circuit 50 through a power switch 70. The power supply device 60 can be a battery. Alternatively, the power supply device 60 can be an AC-DC adapter.

FIG. 3 illustrates the invention used in a toy birthday cake 80. According to this embodiment, the candle light 20 is supported on the toy birthday cake 80. The toy birthday cake 80 comprises a housing 81 that accommodates the other component parts of the sound control candle light 10, including the sound generator 30, the sound sensor 40, the control circuit 50, the power supply device 60 and the power switch 70.

When the power switch 70 of the sound control candle light 10 is switched on and the user is blowing air into the mouthpiece 32 of the sound generator 30, the reed 34 will be vibrated to produce a sound at a specific frequency for sensing by the sound sensor 40. When the sound signal matches, the sound sensor 40 will provide a corresponding sensing signal to the control circuit 50, causing the control circuit 50 to drive the light-emitting device 22. Thus, the candle light 20 will give off light, enabling the toy birthday cake 80 to simulate the burning of real candles on a real cake, and the user needs not to worry about candle burnout problem, flame extinguish problem or fire accident problem. When the user blows the mouthpiece 32 again, the loop will be interrupted to turn off the candle light 20 due to induction of the same sound, thereby simulating the action of extinguishing the flame of a real candle. The candle light on and off alternating functioning will be stopped only when the power switch 70 is switched off.

Figure 4:
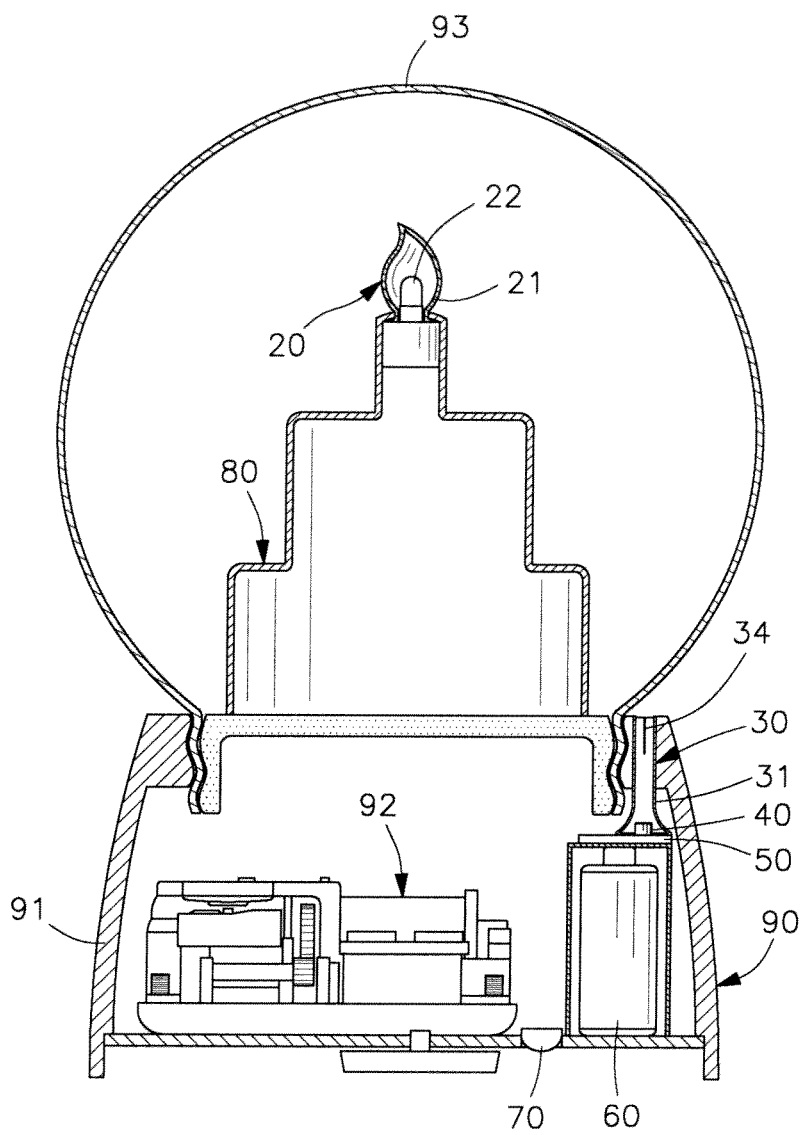
FIG. 4 is another sectional applied view of the present invention, illustrating the sound control candle light used in a music toy.

FIG. 4 illustrates another application example of the present invention, illustrating the sound control candle light 10 used in a music toy 90. As illustrated, the music toy 90 comprises a base member 91, a toy birthday cake 80 mounted on the top side of the base member 91, a music box 92 mounted inside the base member 91 and adapted for playing a happy birthday sound. Further, a glass spherical shell 93 is mounted on the base member 91 in a watertight manner around the toy birthday cake 80. The inside space of the glass spherical shell 93 may be filled up with a fluid (not shown).

Further, ornamental items (not shown) may be put in the fluid inside the glass spherical shell 93, enhancing the sense of beauty.

Further, except the application examples stated above for use with a toy birthday cake 80 and/or music toy 90, the invention can also be installed in a candleholder (not shown).

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A sound control candle light, comprising:
   a candle light, said candle light comprising a lampshade shaped like the flame of a candle and a light-emitting device mounted inside said lampshade;
   a sound generator, said sound generator comprising an enclosed sound pipe having a mouthpiece, and a reed mounted inside said enclosed sound pipe adjacent to said mouthpiece and vibratable to produce a sound at a predetermined frequency when a person blows in said mouthpiece;
   a sound sensor mounted inside said enclosed sound pipe and adapted for sensing the sound produced by said reed and providing a corresponding sensing signal; and
   a control circuit adapted for receiving the sensing signal provided by said sound sensor to drive on/off said light-emitting device.

2. The sound control candle light as claimed in claim 1, wherein said candle light is mounted on a toy birthday cake.

3. The sound control candle light as claimed in claim 1, wherein said candle light is mounted on a candleholder.

4. The sound control candle light as claimed in claim 1, wherein said light-emitting device is a light-emitting diode.

5. The sound control candle light as claimed in claim 1, wherein said enclosed sound pipe is shaped like a horn.

6. The sound control candle light as claimed in claim 2, further comprising a base member supporting said toy birthday cake and a music box mounted inside said base member and adapted for playing a happy birthday sound.

7. The sound control candle light as claimed in claim 6, further comprising a glass spherical shell mounted on said base member in a watertight manner around said toy birthday cake, a fluid filled in said glass spherical shell, and ornamental items placed in said fluid inside said glass spherical shell.

8. The sound control candle light as claimed in claim 1, further comprising a power supply device electrically connected with said light-emitting device, said sound sensor and said control circuit to provide said light-emitting device, said sound sensor and said control circuit with the necessary working DC power, and a power switch switchable to turn on/off said power supply device.

9. The sound control candle light as claimed in claim 8, wherein said power supply device is a battery.

10. The sound control candle light as claimed in claim 8, wherein said power supply device is an AC-DC power adapter adapted for converting city AC power to DC power.

* * * * *